No. 860,791. PATENTED JULY 23, 1907.
F. W. ELLS.
MOISTURE PROOF ELECTRIC MOTOR, DYNAMO, AND THE LIKE.
APPLICATION FILED MAY 2, 1906.
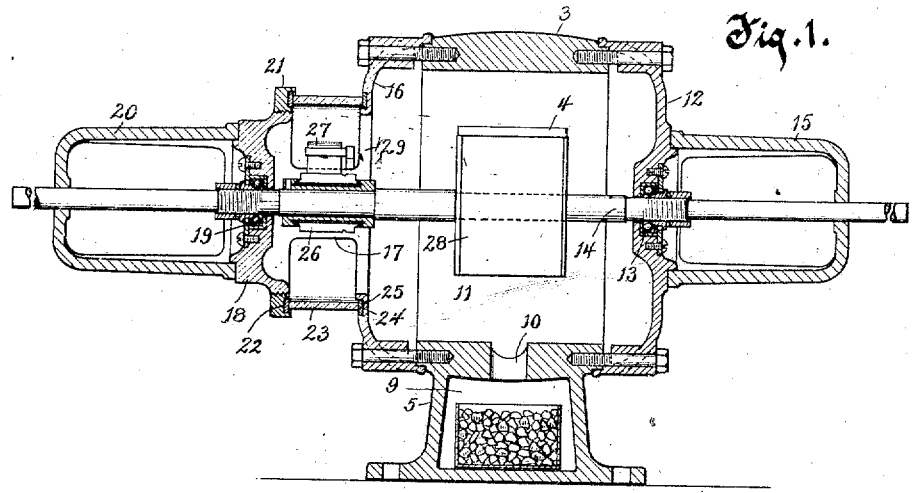
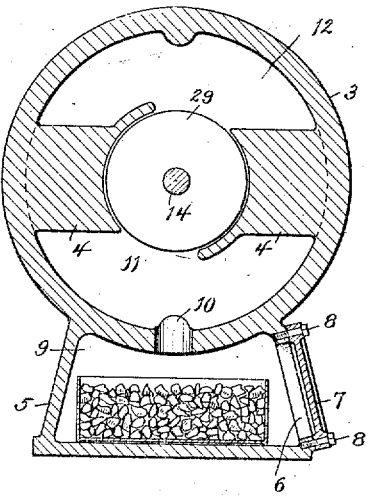
Witnesses.
Inventor.
Frederick W. Ells
By Benedict, Morsell & Caldwell
Attorneys.

UNITED STATES PATENT OFFICE.

FREDERICK W. ELLS, OF MILWAUKEE, WISCONSIN.

MOISTURE-PROOF ELECTRIC MOTOR, DYNAMO, AND THE LIKE.

No. 860,791.    Specification of Letters Patent.    Patented July 23, 1907.

Application filed May 2, 1906. Serial No. 314,736.

*To all whom it may concern:*

Be it known that I, FREDERICK W. ELLS, residing in Milwaukee, in the county of Milwaukee and State of Wisconsin, have invented new and useful Improvements in Moisture-Proof Electric Motors, Dynamos, and the Like, of which the following is a description, reference being had to the accompanying drawings, which are a part of this specification.

My invention relates to moisture proof electric motors, dynamos, and the like, and is more particularly adapted to motors used in connection with railway signal devices, wherein the motors are exposed to the elements, and consequently must be well protected in order to preserve their efficiency, and this with the minimum attention being necessary.

In using electric motors in connection with railway signal devices, it has been found necessary to use what is known as the inclosed type motors, and it has also been found necessary in this type of motor to prevent the gathering of moisture within the motor casing.

My invention contemplates not only a means for preventing as far as possible the accumulation of moisture within the casing, but furthermore provides means for absorbing the moisture from the air within the casing and keeping the interior perfectly dry, thus prolonging the life of the motor by preventing the iron parts from rusting and the insulations from rotting away.

The improved means devised by me also prevents the commutator and brushes of the motor from becoming coated with frost.

Another object is to prevent a film of frost gathering on the commutator and brushes in cold weather, preventing the passage of current from the brushes to the commutator, and the armature from rotating. Motors of this class operate upon low voltage, and unless the interior is kept perfectly dry in cold weather a film of frost will gather between the brushes and the commutator when the motor is at rest, thereby preventing the passage of current when the switch is closed.

In the accompanying drawing, Figure 1 is a longitudinal, vertical section of my invention; and Fig. 2 is a central, vertical section taken at right angles to Fig. 1.

Referring to the drawing, the numeral 3 indicates the main frame of an inclosed type electric motor, provided with the usual field cores 4, 4, and a base or support 5, having an opening 6, provided with a cap 7 bolted to the base of support by means of bolts 8, 8.

A chamber 9 within the base or support 5 is provided in the top wall thereof with an opening 10 communicating with the field chamber 11. To the main frame is bolted a plate 12, provided with a ball bearing 13 adapted to receive and support one end of the armature shaft 14, which shaft is provided with the usual cone to engage the ball bearing. The plate 12 and its ball bearing form practically a moisture-proof inclosure and bearing for this end of the shaft. Extending from plate 12 is an additional guard or support 15 for the shaft 14, the said shaft having a bearing therein. To the main frame 3, at the opposite end thereof, is bolted a casting 16 provided with two extensions 17 (one only being shown in the drawings) said extensions supporting, and having integral therewith, a plate 18, provided with a ball bearing 19 adapted to support the other end of the shaft 14, the said shaft being provided with another cone similar to the one herein before referred to. Plate 18 also has an additional guard or support 20 extending therefrom and through which the shaft 14 passes. Threaded to the plate 18 is a nut 21 provided upon its inner face with an annular recess 22, and in this recess a gasket is placed, to form a moisture-proof joint between the nut 21 and the short glass tube 23. The opposite end of the glass tube 23 fits against a corresponding gasket 24 in a recess 25 in the casting 16, thus providing a moisture-proof joint at this end of the glass.

It will be seen that the arrangement of parts described provides a very simple means for viewing the commutator 26 or the brushes 27 (one only being shown), through the transparent tube 23, or the armature 28 through said tube 23, and through the opening 29, without disturbing any part of the motor.

The description thus far provides for a motor casing which is moisture-proof as far as practicable, but does not describe as yet means for taking up the moisture in the air which might get into the interior of the motor casing through the bearings or joints. To take care of this moisture, I have provided the chamber 9 in the base or support having a communicating opening with the motor interior and adapted to receive through the capped opening 6 a metal receptacle containing calcium chlorid, calcium carbid, lime, or any chemical or compound which has an affinity for moisture. The chemical or compound in the receptacle will absorb all the moisture within the chamber 11, thereby keeping the interior of the motor perfectly dry for a long period of time without attention from the attendant, and preventing deterioration of any of the parts or coating with frost.

For convenience the word "motor" will be used throughout all the claims, but it is to be understood that this invention is applicable to any like electric device, and the claims are to be so construed.

What I claim as my invention is:

1. An electric motor provided with an inclosure, a transparent sight portion forming part of said inclosure, a chamber having communication with the inclosure, and a material which has an affinity for moisture contained within said chamber and adapted to absorb the moisture within the inclosure.

2. An electric motor provided with an inclosure, a chamber having communication with said inclosure, a material which has an affinity for moisture contained within the chamber, and a glass tube forming part of the inclosure and adapted to be used as a sight opening.

3. In an electric motor, the combination of a main frame, a plate provided with a bearing attached thereto, a casting provided with a bearing and with a sight opening, said casting also attached to the main frame, a transparent cover for said opening, a chamber having communication with the inclosure formed by the before-mentioned parts, a receptacle within said chamber, and a material which has an affinity for moisture contained within said receptacle.

4. In an electric motor of the inclosed type, the combination of a main frame, a plate provided with a bearing attached thereto, a casting provided with a bearing and a sight opening, said casting also attached to the main frame, a transparent cover for said opening, a chamber having communication with the inclosure formed by the before-mentioned parts, said chamber provided with a capped opening and a material having affinity for moisture contained within the chamber.

5. An electric motor provided with a surrounding casing forming an inclosure, a transparent sight portion constituting part of said inclosure, a chamber formed in the base of the casing and having communication with the interior of the inclosure, and a material which has an affinity for moisture contained within said chamber and adapted to absorb the moisture within the inclosure.

In testimony whereof, I affix my signature, in presence of two witnesses.

FREDERICK W. ELLIS.

Witnesses:
  A. L. MORSELL,
  ANNA F. SCHMIDTBAUER.